United States Patent
Kang et al.

(10) Patent No.: US 9,617,930 B2
(45) Date of Patent: Apr. 11, 2017

(54) METHOD AND SYSTEM FOR CONTROLLING A POWERTRAIN

(71) Applicant: GM GLOBAL TECHNOLOGY OPERATIONS LLC, Detroit, MI (US)

(72) Inventors: Jun-Mo Kang, Ann Arbor, MI (US); Orgun A. Guralp, Ann Arbor, MI (US); Hanho Yun, Oakland Township, MI (US); Sai S. V. Rajagopalan, Bloomfield Hills, MI (US); Chen-Fang Chang, Troy, MI (US); Paul M. Najt, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 452 days.

(21) Appl. No.: 14/256,478

(22) Filed: Apr. 18, 2014

(65) Prior Publication Data

US 2015/0300279 A1    Oct. 22, 2015

(51) Int. Cl.
*F02D 41/00* (2006.01)
*F02D 41/30* (2006.01)

(52) U.S. Cl.
CPC ....... *F02D 41/0002* (2013.01); *F02D 41/006* (2013.01); *F02D 41/0007* (2013.01); *F02D 41/3035* (2013.01); *F02D 2041/001* (2013.01); *F02D 2041/002* (2013.01); *F02D 2200/0406* (2013.01); *F02D 2200/703* (2013.01); *Y02T 10/144* (2013.01); *Y02T 10/18* (2013.01); *Y02T 10/42* (2013.01); *Y02T 10/47* (2013.01)

(58) Field of Classification Search
CPC ...... F02D 41/18; F02D 41/182; F02D 41/185; F02D 41/187; F02D 41/0002; F02D 41/00; F02D 2041/001; F02D 41/007; F02D 41/1438; F02D 41/144; F02D 41/1441
USPC .................................................. 701/101–115
See application file for complete search history.

(56) References Cited

U.S. PATENT DOCUMENTS

| | | | | |
|---|---|---|---|---|
| 5,205,260 A | * | 4/1993 | Takahashi | F02D 41/0072 123/492 |
| 5,282,449 A | * | 2/1994 | Takahashi | F02D 41/1401 123/350 |
| 7,013,211 B2 | * | 3/2006 | Machida | F01L 1/022 123/347 |
| 7,292,931 B2 | * | 11/2007 | Davis | F02D 41/18 701/102 |
| 2004/0060540 A1 | * | 4/2004 | Fuwa | F02D 13/0253 123/346 |
| 2004/0083047 A1 | * | 4/2004 | Li | F02D 41/18 701/102 |

(Continued)

*Primary Examiner* — Thomas Moulis
(74) *Attorney, Agent, or Firm* — Quinn IP Law

(57) ABSTRACT

The method can control a powertrain in order to maintain the charge temperature at a desired value regardless of exhaust manifold pressure or altitude. The method includes the following steps: (a) receiving a torque request; (b) determining a desired air charge based, a least in part, on the torque request; (c) determining an actual air charge based, at least in part, on input signals from a manifold absolute pressure (MAP) sensor and a mass airflow (MAF) sensor; (d) adjusting an intake valve timing of the intake valve such that the actual air charge is equal to a desired air charge, and (e) adjusting throttle position and actuator positions of boosting devices such that the actual intake manifold pressure is equal to the desired intake manifold pressure.

5 Claims, 2 Drawing Sheets

(56) References Cited

U.S. PATENT DOCUMENTS

| | | | | |
|---|---|---|---|---|
| 2008/0167787 A1* | 7/2008 | Kang | ............... | F02D 13/0219 |
| | | | | 701/103 |
| 2009/0204283 A1* | 8/2009 | Roberts | ............ | F01L 13/0015 |
| | | | | 701/31.4 |
| 2015/0377158 A1* | 12/2015 | Benjey | ................ | F02B 39/10 |
| | | | | 701/22 |

* cited by examiner

METHOD AND SYSTEM FOR CONTROLLING A POWERTRAIN

TECHNICAL FIELD

The present disclosure relates to a method and system for controlling a powertrain.

BACKGROUND

A powertrain can propel a vehicle and may include an internal combustion engine and an intake manifold in fluid communication with the internal combustion engine. The internal combustion engine has at least one cylinder and can receive air from the intake manifold. Then, the internal combustion engine can combust an air/fuel mixture in the cylinders in order to generate output torque. An intake valve controls the airflow to the cylinders. Specifically, the intake valve can open and close at specific times to either allow air to enter the cylinders or preclude air from the entering the cylinders. The internal combustion engine may be a homogenous charge compression ignition (HCCI) engine. In an HCCI engine, an air/fuel mixture is compressed to the point of auto-ignition.

SUMMARY

In an HCCI engine receiving fuel at a constant fueling rate, it is useful to maintain the air-fuel ratio and the residual gas fraction at the desired values in order operate the HCCI engine in an efficient matter. The charge temperature in the engine depends on the residual gas fraction when the intake valve closes, and the residual gas fraction may vary depending on the altitude. Consequently, it is useful to maintain the charge temperature at a desired value at intake valve closing regardless of the altitude in order to operate the HCCI engine in an efficient manner. To do so, the intake and exhaust valve timings may be controlled. The present disclosure relates to a method of controlling the powertrain (and in particular the intake and exhaust valves and boosting system) in order to maintain the charge temperature regardless of the exhaust manifold pressure or altitude by controlling the actual air charge and actual intake manifold pressure. In the present disclosure, the term "actual air charge" refers to the actual amount of air (e.g., mass) introduced into the cylinders of the engine during a single combustion cycle. The presently disclosure describes a method for controlling a powertrain including an HCCI internal combustion engine. The internal combustion engine has at least one cylinder, and the powertrain further includes an intake manifold in fluid communication with the internal combustion engine and at least one intake valve configured to control airflow between the intake manifold and the internal combustion engine. Moreover, the powertrain includes a system control module, a mass airflow (MAF) sensor in communication with the system control module and a manifold absolute pressure (MAP) sensor in communication with the system control module. The MAF sensor is configured to measure airflow entering the throttle, and the MAP sensor is configured to measure an intake manifold pressure. In an embodiment, the method includes the following steps: (a) receiving a torque request; (b) determining a desired air charge based, at least in part, on the torque request; (c) determining an actual air charge based, at least in part, on input signals from the MAP sensor and the MAF sensor; (d) adjusting an intake valve timing of the intake valve such that the actual air charge is equal to the desired air charge, and (e) adjusting throttle position and actuator positions of boosting devices such that the actual intake manifold pressure is equal to the desired intake manifold pressure The "desired air charge" is an amount of air introduced into the cylinders during a single combustion cycle in order to achieve the torque requested, and the "the actual air charge" is a current amount of air introduced into the cylinders during a single combustion cycle. The present disclosure also relates to a powertrain including a system controller capable of executing the method described above.

The above features and advantages and other features and advantages of the present invention are readily apparent from the following detailed description of the best modes for carrying out the invention when taken in connection with the accompanying drawings.

DETAILED DESCRIPTION

Figure 1:
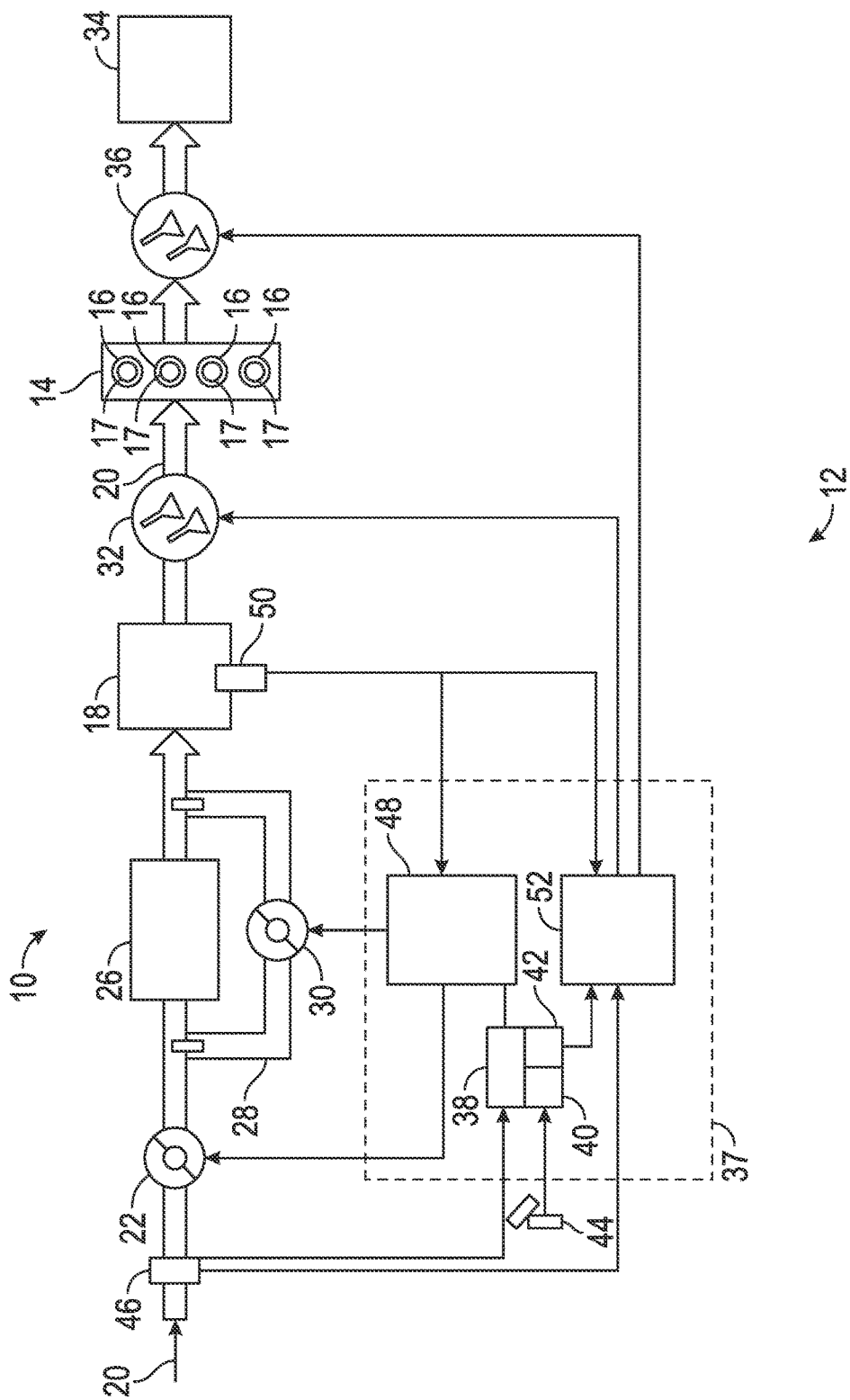
FIG. 1 is a schematic block diagram of a powertrain.

Referring to the drawings, wherein like reference numerals are used to identify like or identical components in the various views, FIG. 1 schematically illustrates a vehicle 10 including a powertrain 12. The powertrain 12 can propel the vehicle 10 and includes an internal combustion engine 14 configured to combust an air/fuel mixture. In particular, a homogenous charge compression ignition (HCCI) occurs in the internal combustion engine 14. The internal combustion engine 14 is a boosted HCCI engine and has at least one cylinder 16. Although the drawings show four cylinders 16, the internal combustion engine 14 may have more or fewer cylinders 16. Each cylinder 16 is sized to receive a piston 17, and each piston 17 can reciprocate inside a corresponding cylinder 16.

In addition to the internal combustion engine 14, the powertrain 12 further includes an intake manifold 18 configured to receive air 20 from the atmosphere. The intake manifold can direct air 20 to the internal combustion engine 14. To do so, the intake manifold 18 is in fluid communication with the internal combustion engine 14. Specifically, the intake manifold 18 is in fluid communication with the cylinders 16 and can therefore direct air to the cylinders 16 of the internal combustion engine 14.

The powertrain 12 includes a throttle 22 capable of regulating the amount of air 20 entering the intake manifold 18. The throttle 22 is therefore in fluid communication with the intake manifold 18. The throttle 22 can be located either after or before a boosting device 26.

Further, the powertrain 12 includes a boosting device 26 fluidly interconnecting the throttle 22 and the intake manifold 18. In the present disclosure, the term "boosting device" refers to a device capable of increasing the pressure of the air 20 relative to the atmospheric pressure. As non-limiting examples, the boosting device 26 may be a supercharger, a turbocharger, or both. Accordingly, the boosting device 26 may include a compressor capable of compressing the air 20 originating from the atmosphere. The air 20, however, does not necessarily have to flow through the boosting device 26 to reach the intake manifold 18. The powertrain 12 may include a bypass conduit 28 fluidly interconnecting the throttle 22 and the intake manifold 18. The bypass conduit 28 bypasses the boosting device 26 and allows at least some of the air 20 to flow from the throttle 22 to the intake manifold 18 without flowing through the boosting device 26.

A bypass valve 30 is disposed along the bypass conduit 28 and can regulate the amount of air 20 that flows through the bypass conduit 28. In other words, the bypass valve 30 can regulate the amount of air 20 that bypasses the boosting device 26.

The powertrain 12 further includes at least one intake valve 32 operatively coupled between the intake manifold 18 and the cylinders 16 of the internal combustion engine 14. Each intake valve 32 can regulate the amount of air 20 that flows into at least one of the cylinders 16. In particular, the intake valves 32 can move between an open position and a closed position. In the closed position, the intake valve 32 precludes flow of air 20 between the intake manifold 18 and the cylinder 16 of the internal combustion engine 14. In the open position, the intake valve 32 allows air 20 to flow from the intake manifold 18 to the cylinder 16.

After combustion of the air/fuel mixture in the cylinders 16, exhaust gases can flow from the cylinders 16 to the exhaust manifold 34. To this end, the exhaust manifold 34 is in fluid communication with the cylinders 16 of the internal combustion engine 14. The powertrain 12 additionally includes at least one exhaust valve 36 operatively coupled between the exhaust manifold 34 and the cylinders 16 of the internal combustion engine 14. Accordingly, each exhaust valve 36 can regulate the flow of exhaust gases from the cylinders 16 to the exhaust manifold 34. In particular, each exhaust valve 36 can move between an open position and a closed position. When the exhaust valve 36 is in the open position, exhaust gases can flow from the cylinder 16 to the exhaust manifold 34. Conversely, when the exhaust valve 36 is in the closed position, exhaust gases are precluded from flowing between the cylinder 16 and the exhaust manifold 34.

Figure 2:
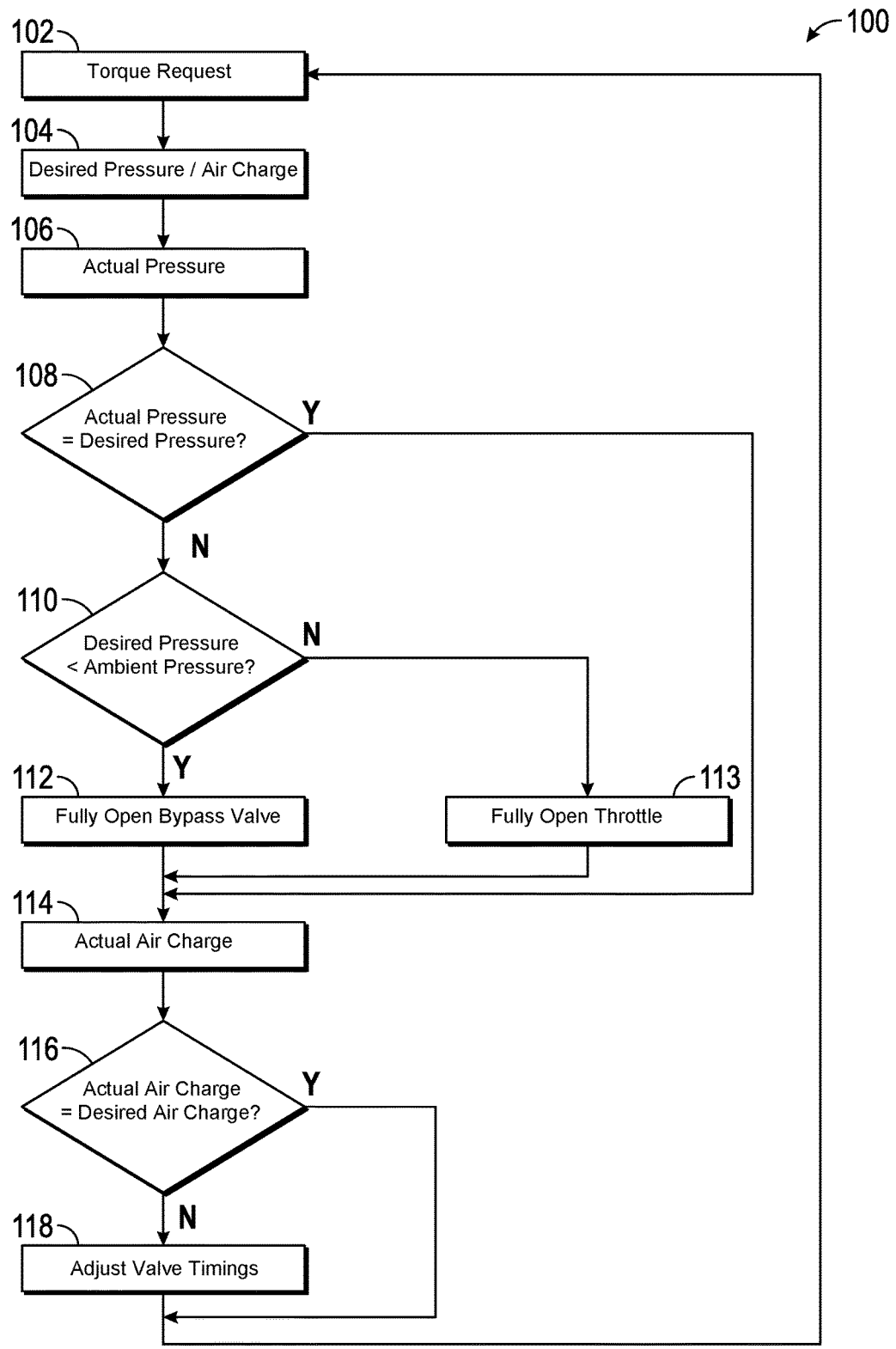
FIG. 2 is a schematic flowchart of a method for controlling the powertrain of FIG. 1.

The powertrain 12 further includes a system control module 38 in electronic communication with the internal combustion engine 14. The terms "control module," "control," "controller," "control unit," "processor" and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), sequential logic circuit(s), input/output circuit(s) and devices, appropriate signal conditioning and buffer circuitry, and other components to provide the described functionality. "Software," "firmware," "programs," "instructions," "routines," "code," "algorithms" and similar terms mean any controller executable instruction sets including calibrations and look-up tables. The control module 38 is specifically programmed to execute the steps of the method 100 (FIG. 2) and, in the depicted embodiment, includes a processor 40 and a memory 42 in communication with the processor 40. The memory 42 can store the steps of the method 100 (FIG. 2) and the processor 40 can execute the steps of the method 100 (FIG. 2). The system control module 38 may be part of a control system 37 of the powertrain 12.

The system control module 38 can receive inputs from various sensors and can control the powertrain 12 based on those inputs. In the depicted embodiment, the powertrain 12 includes a torque request actuator 44, such as an accelerator pedal, configured to receive input from a user. For example, the user may actuate (e.g., press) the torque request actuator 44 in order to request additional output torque from the powertrain 12. Because the torque request actuator 44 is in communication (e.g., electronic communication) with the system control module 38, the system control module 38 can receive the torque request from the torque request actuator 44. Upon receipt the torque request, the system control module 38 can determine the desired intake manifold pressure and the desired intake air charge based, at least in part, on the torque request. As used herein, the "desired intake manifold pressure" refers to the pressure of the air inside the intake manifold 18 necessary to generate the torque requested. Further, in the present disclosure, the term "desired air charge" refers to the amount of air (e.g., mass) introduced into the cylinders 16 during a single combustion cycle in order to achieve the torque requested.

The powertrain 12 additionally includes a mass airflow (MAF) sensor 46 in communication (e.g., electronic communication) with the system control module 38. The MAF sensor 46 can measure ambient pressure, ambient temperature, and airflow entering the throttle 22. In operation, the MAF sensor 46 can generate one or more input signals indicative of the ambient pressure, ambient temperature, and airflow entering the throttle 22. The system control module 38 can receive input signals from the MAF sensor 46 and determine the ambient pressure, ambient temperature, and airflow entering the throttle 22 based on those input signals.

The control system 37 also includes a manifold absolute pressure (MAP) controller 48 in communication (e.g., electronic communication) with the system control module 38, the throttle 22 and the bypass valve 30. The MAP controller 48 can receive data relating to the desired intake manifold pressure from the system control module 38 and control the throttle 22 and the bypass valve 30 based, at least in part, on the desired intake manifold pressure.

Aside from the MAP controller 48, the powertrain 12 includes a manifold absolute pressure (MAP) sensor 50 operatively coupled to the intake manifold 18. As such, the MAP sensor 50 can measure the actual intake manifold pressure. In the present disclosure, the term "actual intake manifold pressure" refers to the pressure of the air inside the intake manifold 18 as measured by the MAP sensor 50. In operation, the MAP sensor 50 can generate an input signal indicative of the actual intake manifold pressure and send that input signal to the MAP controller 48. The MAP controller 48 can receive an input signal from the MAP sensor 50 and determine the actual intake manifold pressure based on the input signal received from the MAP sensor 50.

The control system 37 further includes an air charge controller 52 in communication (e.g., electronic communication) with the system control module 38, the MAF sensor 46, and the intake valves 32 and the exhaust valves 36. The air charger controller 52 can control the operation of the intake valves 32 and the exhaust valves 36. For instance, the air charger controller 52 may include cam phasers and can independently control the intake and exhaust valve timing. As used herein, the term "intake valve timing" refers to the timing of the opening and closing of an intake valve 32 with respect to the movement of the corresponding piston 17, and the term "exhaust valve timing" refers to the timing of the opening and closing of the exhaust valve 36 with respect to the movement of the corresponding piston 17.

FIG. 2 is a flowchart of a method 100 for controlling the powertrain 12. Specifically, the system control module 38 can execute the method 100 in order to maintain the charge temperature substantially constant at intake valve closing regardless of the exhaust manifold pressure by maintaining the intake manifold pressure and air charge mass substantially constant. In an HCCI engine receiving fuel at a constant fueling rate, it is useful to maintain the air-fuel ratio and the charge temperature at the desired values in order operate the HCCI engine in an efficient matter. The charge temperature in the engine depends on the residual gas fraction when the intake valve closes, and the residual gas fraction may vary depending on the exhaust manifold pressure or altitude. Consequently, it is useful to maintain the air charge temperature at a desired value at intake valve closing regardless of the altitude in order to operate the HCCI engine in an efficient manner. To do so, the intake and exhaust valve timings, throttle position and actuators of boosting devices may be controlled. In view of the foregoing, the method 100 regulates the intake and exhaust valve timings, throttle position and actuator positions of boosting devices in order to maintain the charge temperature substantially constant regardless of the exhaust manifold pressure or altitude.

The method 100 begins at step 102. Step 102 entails receiving, via the system control module 38, a torque request from, for example, a user via the torque request actuator 44. In other words, the system control module 38 is specifically programmed to receive a torque request. After receiving the torque request, the method 100 continues to step 104.

Step 104 entails determining, via the system control module 38, a desired intake pressure and a desired air charge based, at least in part, on the torque request as well as other operating conditions of the internal combustion engine 14. In other words, in step 104, the system control module 38 determines the desired intake pressure and a desired air charge based, at least in part, on the torque request received in step 102. As discussed above, the "desired intake manifold pressure" refers to the pressure of the air inside the intake manifold 18 necessary to generate the torque requested, and the term "desired air charge" refers to the amount of air (e.g., mass) introduced into the cylinders 16 during a single combustion cycle in order to achieve the torque requested. Then, the method 100 proceeds to step 106.

Step 106 entails determining, via the system control module 38, the actual intake manifold pressure based on an input signal from the MAP sensor 50. As discussed above, the term "actual intake manifold pressure" refers to the pressure of the air inside the intake manifold 18 as measured by the MAP sensor 50. To do so, the MAP sensor 50 measures the intake manifold pressure and then sends an input signal to the system controller 38 through the MAP controller 48. This input signal is indicative of the actual intake manifold pressure. The system controller 38 receives this input signal and can store the actual intake manifold pressure in the memory 42. Next, the method 100 proceeds to step 108.

Step 108 entails comparing, via the system control module 38, the actual manifold pressure with the desired intake manifold pressure in order to determine if the actual manifold pressure is equal to the desired manifold pressure. In other words, in step 108, the system control module 38 compares the actual manifold pressure with the desired intake manifold pressure in order to determine if the actual manifold pressure is equal to the desired manifold pressure. If the actual manifold pressure is equal to the desired manifold pressure, then the method 100 continues to step 114 as discussed below. However, if the actual manifold pressure is not equal to the desired manifold pressure, then the method 100 continues to step 110.

Step 110 entails determining, via the system control module 38, if the desired intake manifold pressure is less than the ambient pressure. In other words, in step 110, the system control module 38 determines if the desired intake manifold pressure is less than the ambient pressure. As discussed above, the system control module 38 can determine the desired intake manifold pressure in step 104 based, at least in part, on the torque request received in step 102. The ambient temperature can be determined based on the input signal received from the MAF sensor 46. Thus, the system control module 38 can determine the ambient pressure based, at least in part, on the input signal from the MAP sensor 46.

If the desired intake manifold pressure is less than the ambient pressure, then the method 100 proceeds to step 112. In step 112, the system control module 38 commands the bypass valve 30 (through the MAP controller 48) to move to a fully open position and the throttle 22 to move to a position such that the actual intake manifold pressure is equal to the desired intake manifold pressure. In other words, step 112 entails commanding the bypass valve 30 to move to its fully open position and the throttle 22 to move to a position to allow the actual intake manifold pressure to be equal (or substantially equal) to the desired intake manifold pressure determined in step 104. In the fully open position, the bypass valve 30 does not restrict the flow of air through the bypass conduit 28. Step 112 further includes moving the bypass valve 30 to the fully open position and adjusting the throttle 22 to a position such that the actual intake manifold pressure is equal to the desired intake manifold pressure.

If the desired intake manifold pressure is greater than or equal to the ambient pressure, then the method 100 proceeds to step 113. In step 113, the system control module 38 commands the throttle 22 to move to its fully open position and the bypass valve 30 to move to a position such that the actual intake manifold pressure is equal (or substantially similar) to the desired intake manifold pressure. Thus, step 113 entails commanding the throttle 22 to move to its fully open position and the bypass valve 30 to move to a position such that the actual intake manifold pressure is equal (or substantially similar) to the desired intake manifold pressure. Step 113 further includes moving the throttle 22 to its fully open position and adjusting the bypass valve 30 to a position such that the actual intake manifold pressure is equal to the desired intake manifold pressure. After completing either step 112 or 113, the method 100 proceeds to step 114.

Step 114 entails determining, via the system control module 38, an actual air charge based, at least in part, on the input signals from the MAF sensor 46 and the MAP sensor 50. In the present disclosure, the term "actual air charge" refers to the actual (or at least estimated) amount of air (e.g., mass) introduced into the cylinders 16 during a single combustion cycle. The actual air charge is an estimated value and may be based, at least in part, on the ambient pressure, ambient temperature, airflow entering the throttle 22, and the actual intake manifold pressure. In step 114, the system control module 38 determines the actual air charge based, at least in part, on the input signals from the MAF sensor 46 and the MAP sensor 50. Next, the method 100 proceeds to step 116.

Step 116 entails comparing, via the system control module 38, the desired air charge (determined in step 104) with the actual air charge (determined in step 114) in order to determine if the actual air charge is equal (or substantially similar) to the desired air charge. Thus, in step 116, the system control module 38 compares the desired air charge with the actual air charge in order to determine if the actual air charge is equal to (or substantially similar) to the desired air charge. If the actual air charge is equal to (or substantially similar) to the desired air charge, the method 100 returns to step 102. On the other hand, if the actual air charge is not equal to (or substantially similar) to the desired air charge, the method 100 proceeds to step 118.

Step 118 entails adjusting the intake and exhaust valve timings such that the actual air charge is equal to (substantially equal) to the desired air charge determined in step 104. As discussed above, the term "intake valve timing" refers to the timing of the opening and closing of the intake valves 32 with respect to the movement of the corresponding piston 17, and the term "exhaust valve timing" refers to the timing of the opening and closing of the exhaust valves 36 with respect to the movement of the piston 17. In step 118, the system control module 38 can command the air charge controller 52 to adjust the intake valve timing of the intake valves 32 and the exhaust valve timing of the exhaust valves 36 such that the actual air charge is equal to the desired air charge.

While the best modes for carrying out the invention have been described in detail, those familiar with the art to which this invention relates will recognize various alternative designs and embodiments for practicing the invention within the scope of the appended claims.

The invention claimed is:

1. A method for controlling a powertrain, the powertrain including an internal combustion engine having at least one cylinder, an intake manifold in fluid communication with the internal combustion engine, a throttle in fluid communication with the intake manifold, at least one intake valve configured to control airflow between the intake manifold and the internal combustion engine, a system control module, a mass airflow (MAF) sensor in communication with the system control module and configured to measure airflow entering the throttle, and a manifold absolute pressure (MAP) sensor in communication with the system control module and being configured to measure an intake manifold pressure, the method comprising:

receiving a torque request, wherein the powertrain further includes a boosting device disposed between the throttle and the intake manifold, a bypass conduit disposed between the throttle and the intake manifold and bypassing the boosting device, and a bypass valve along the bypass conduit and configured to control airflow through the bypass conduit, the system control module includes a processor and a memory in communication with the processor;

determining a desired air charge based, at least in part, on the torque request, wherein the desired air charge is an amount of air introduced into the at least one cylinder during a single combustion cycle in order to achieve the torque requested;

determining an actual air charge based, at least in part, on input signals from the MAP sensor and the MAF sensor, wherein the actual air charge is a current amount of air introduced into the at least one cylinder during the single combustion cycle; and adjusting an intake valve timing of the at least one intake valve such that the actual air charge is equal to the desired air charge regardless of exhaust manifold pressure or altitude;

determining a desired intake manifold pressure based, at least in part, on the torque request;

determining an actual intake manifold pressure based, at least in part, on the input signal from the MAP sensor;

comparing the actual intake manifold pressure with the desired intake manifold pressure in order to determine if the desired intake manifold pressure is equal to the actual intake manifold pressure;

comparing the desired intake manifold pressure with an ambient pressure to determine if the intake manifold pressure is less than the ambient pressure; and moving the bypass valve to a fully open position and adjusting a position of the throttle such that the actual intake manifold pressure is equal to the desired intake manifold pressure regardless of exhaust manifold pressure or altitude if the desired intake pressure is less than the ambient pressure.

2. The method of claim 1, further comprising adjusting an exhaust valve timing of at least one exhaust valve such that the actual air charge is equal to the desired air charge, wherein the powertrain further includes an exhaust manifold and the at least one exhaust valve is configured to control a flow of exhaust gases between the exhaust manifold and the at least one cylinder regardless of exhaust manifold pressure or altitude.

3. The method of claim 1, further comprising moving the throttle to a fully open position and adjusting a position of the bypass valve such that the actual intake manifold pressure is equal to the desired intake manifold pressure regardless of exhaust manifold pressure or altitude if the desired intake pressure is greater than or equal to the ambient pressure.

4. A powertrain, comprising:

an internal combustion engine having at least one cylinder;

an intake manifold in fluid communication with the internal combustion engine;

a throttle in fluid communication with the intake manifold;

at least one intake valve configured to control airflow between the intake manifold and the at least one cylinder;

a system control module including a processor and a memory in communication with the processor;

a mass airflow (MAF) sensor in communication with the system control module, wherein the MAF sensor is configured to measure airflow entering the throttle;

a manifold absolute pressure (MAP) sensor in communication with the system control module, wherein the MAP sensor is configured to measure intake manifold pressure;

an exhaust manifold coupled to the internal combustion engine;

at least one exhaust valve configured to control a flow of exhaust gases between the exhaust manifold and the at least one cylinder;

a boosting device disposed between the throttle and the intake manifold;

a bypass conduit disposed between the throttle and the intake manifold and bypassing the boosting device;

a bypass valve along the bypass conduit and configured to control airflow through the bypass conduit;

wherein the system control module is specifically programmed to:

receive a torque request;

determine a desired air charge based, at least in part, on the torque request, wherein the desired air charge is an amount of air introduced into the at least one cylinder during a single combustion cycle in order to achieve the torque requested;

determine an actual air charge based, at least in part, on input signals from the MAP sensor and the MAF sensor, wherein the actual air charge is a current amount of air introduced into the at least one cylinder during the single combustion cycle; and command an adjustment of an intake valve timing of the at least one intake valve such that the actual air charge is equal to the desired air charge regardless of exhaust manifold pressure or altitude;

command an adjustment of an exhaust valve timing of at least one exhaust valve such that the actual air charge is equal to the desired air charge regardless of exhaust manifold pressure or altitude determine a desired intake manifold pressure based, at least in part, on the torque request;

determine an actual intake manifold pressure based, at least in part, on the input signal from the MAP sensor;

compare the actual intake manifold pressure with the desired intake manifold pressure in order to determine if the desired intake manifold pressure is equal to the actual intake manifold pressure;

compare the desired intake manifold pressure with an ambient pressure to determine if the intake manifold pressure is less than the ambient pressure; and command the bypass valve to move to a fully open position and the throttle to move to a position such that the actual intake manifold pressure is equal to the desired intake manifold pressure regardless of exhaust manifold pressure or altitude if the desired intake pressure is less than the ambient pressure.

5. The powertrain of claim 4, wherein the system control module is configured to command the throttle to move to a fully open position and the bypass valve to move to a position such that the actual intake manifold pressure is equal to the desired intake manifold pressure regardless of exhaust manifold pressure or altitude if the desired intake pressure is greater than or equal to the ambient pressure.

* * * * *